United States Patent
Martinsen et al.

(10) Patent No.: US 9,992,091 B2
(45) Date of Patent: Jun. 5, 2018

(54) PERFORMING NETWORK TOPOLOGY TRACES WITH MINIMAL DATA COLLECTION

(71) Applicant: Cisco Technology, Inc., San Jose, CA (US)

(72) Inventors: Pål-Erik Martinsen, Ås (NO); Daniel G. Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 219 days.

(21) Appl. No.: 14/953,861

(22) Filed: Nov. 30, 2015

(65) Prior Publication Data

US 2017/0155566 A1    Jun. 1, 2017

(51) Int. Cl.
*H04L 12/26*    (2006.01)

(52) U.S. Cl.
CPC ................ *H04L 43/0864* (2013.01)

(58) Field of Classification Search
None
See application file for complete search history.

(56) References Cited

U.S. PATENT DOCUMENTS

| | | |
|---|---|---|
| 7,496,044 B1 | 2/2009 | Wing |
| 7,519,006 B1 | 4/2009 | Wing |
| 7,596,096 B2 | 9/2009 | Crawford et al. |
| 7,706,278 B2 * | 4/2010 | Wing ............... H04L 43/026 370/236 |
| 7,729,267 B2 | 6/2010 | Oran et al. |
| 7,843,815 B2 | 11/2010 | Znamova et al. |
| 8,483,069 B1 * | 7/2013 | Bobade .............. H04L 43/0858 370/241 |
| 2003/0033404 A1 | 2/2003 | Richardson |
| 2004/0017806 A1 * | 1/2004 | Yazdy ................. H04L 49/357 370/389 |
| 2007/0041335 A1 | 2/2007 | Znamova et al. |
| 2014/0161436 A1 * | 6/2014 | Lee ....................... H04B 10/03 398/1 |
| 2015/0319077 A1 | 11/2015 | Vasseur et al. |

OTHER PUBLICATIONS

European Search Report dated Mar. 21, 2017 in connection with European Application No. 16200357.8.
Fischer, et al., "VisTracer: A Visual Analytics Tool to Investigate Routing Anomalies in Traceroutes", VizSec '12, Proceedings of the Ninth International Symposium on Visualization for Cyber Security, Oct. 15, 2012, pp. 80-87, ACM, New York, NY.
Martinsen, et al., "STUN Traceroute", TRAM Internet Draft, draft-martinsen-tram-stuntrace-01, Jun. 1, 2015, 11 pages, The Internet Engineering Task Force Trust.
"MTR (Software)", https://en.wikipedia.org/wiki/MTR_(software), Feb. 23, 2015, printed Oct. 20, 2015, 3 pages, The Wikimedia Foundation, Inc.

* cited by examiner

*Primary Examiner* — Alex Skripnikov
(74) *Attorney, Agent, or Firm* — Parker Ibrahim & Berg LLP; James M. Behmke; Stephen D. LeBarron

(57) ABSTRACT

In one embodiment, a device in a network receives privatized network trace data that comprises round trip time information for hops along a communication path. The device groups the trace data into a plurality of network segments based on the round trip time information. The device calculates a segment trip time metric for one or more of the network segments based on the round trip time information associated with the one or more network segments.

16 Claims, 7 Drawing Sheets

PERFORMING NETWORK TOPOLOGY TRACES WITH MINIMAL DATA COLLECTION

TECHNICAL FIELD

The present disclosure relates generally to computer networks, and, more particularly, to performing network topology traces with minimal data collection.

BACKGROUND

Generally, network topology traces allow network administrators and other interested parties to obtain information about the path taken when data is communicated in a network. For example, such a trace may identify the individual devices and hops taken along the communication path, as well as performance metrics for each of the hops in terms of packet loss, transit time, etc. This information can then be aggregated and analyzed, to detect potential network problems.

While network topology traces can provide useful information to an interested party, there are many situations in which the operator of a network may not wish to reveal too much information regarding the inner workings of the operator's network. For example, a given service provider may not wish to reveal the network addresses of the various hops along the communication path being traced. In other words, a spectrum of trace information exists that spans from providing all available information in the trace results to blocking trace responses at the edge of the local network, entirely.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network receives privatized network trace data that comprises round trip time information for hops along a communication path. The device groups the trace data into a plurality of network segments based on the round trip time information. The device calculates a segment trip time metric for one or more of the network segments based on the round trip time information associated with the one or more network segments.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1A:
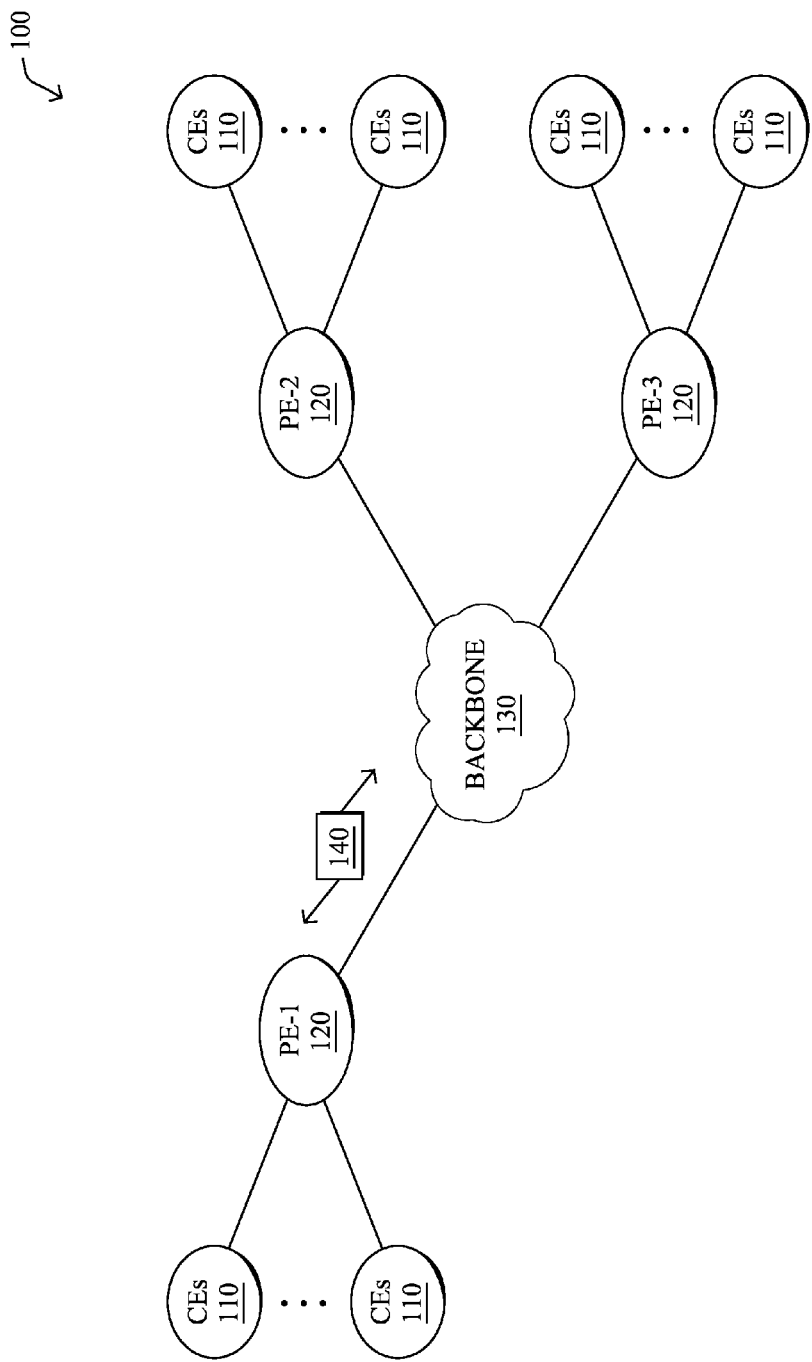
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
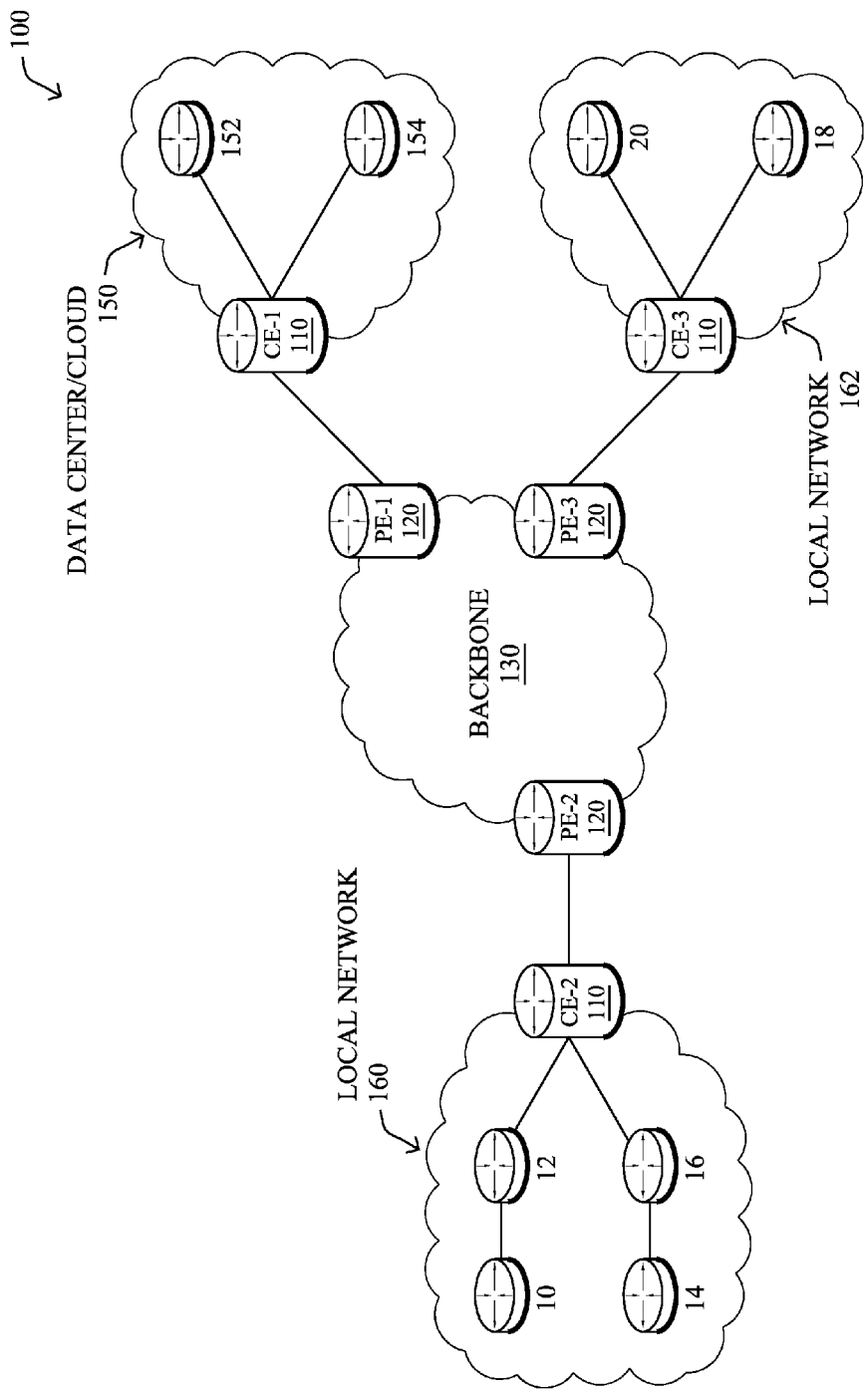

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

Figure 2:
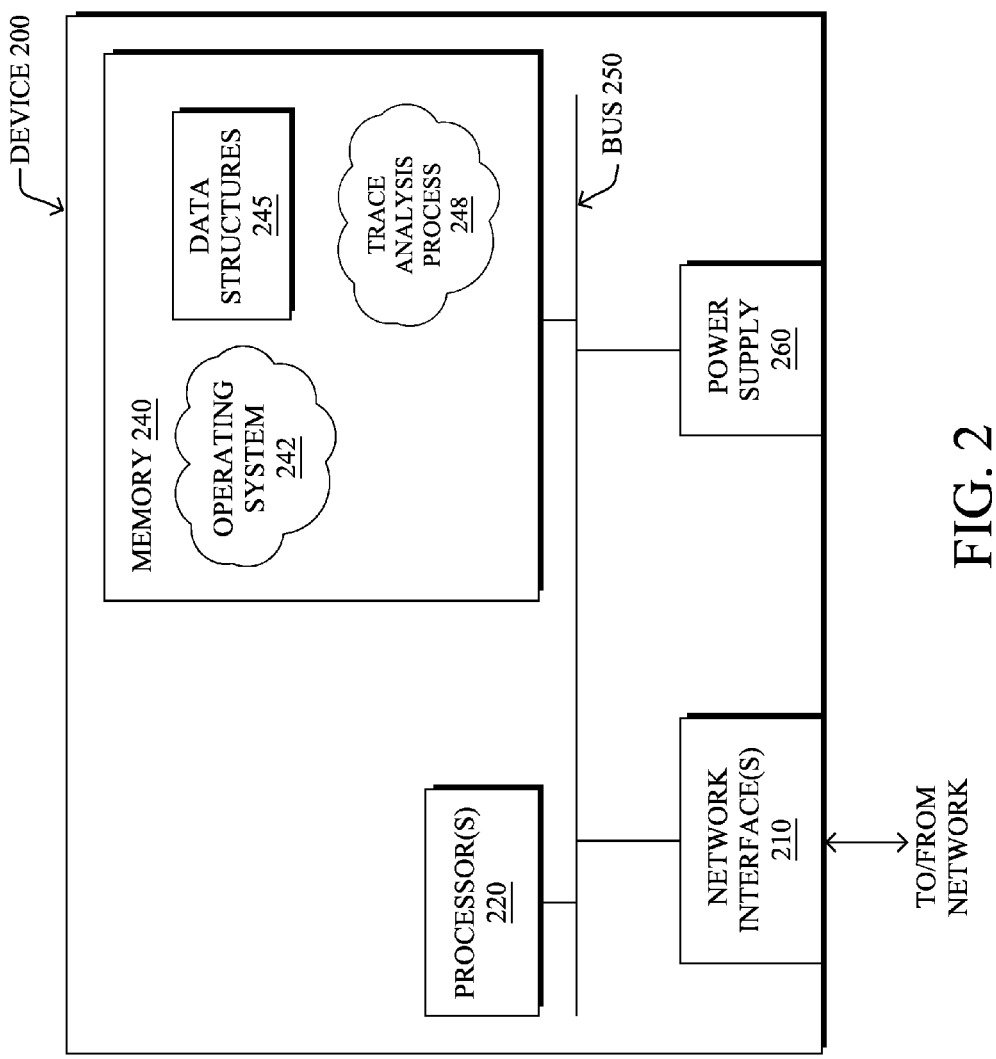
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices described herein. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a trace analysis process 248, as described herein, which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Generally, trace analysis process 248 may be configured to analyze trace data that results from conducting a network trace. In some embodiments, trace analysis process 248 may be further configured to initiate and perform the actual network trace. In other embodiments, trace analysis process 248 may receive and analyze the trace data from another element or process that performs the actual trace.

In various embodiments, trace analysis process 248 may be operable to analyze trace results that include only minimal information regarding the network path. Notably, trace analysis process 248 may be configured to analyze and compute metrics for trace information that is limited to only round trip time (RTT) information.

In some embodiments, trace analysis process 248 may utilize machine learning techniques, to determine characteristics of the communication path and/or determine whether to initiate additional traces of the path (e.g., to assess whether the current trace results are of sufficient accuracy or sufficient detail, etc.). In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of determining characteristics of a network path, a learning machine may construct a model of observed characteristics and compare newly observed information to the model. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that may be of particular use in the context of analyzing network trace data is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of analyzing network trace data. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

Performing Network Topology Traces with Minimal Data Collection

The techniques herein facilitate network troubleshooting through the analysis of trace data that includes only minimal information regarding the communication path. In some aspects, the techniques herein may be used to provide a network administrator or other interested party a rough estimate of where a problem may exist along the communication path, while not requiring network providers to return trace results that include sensitive information regarding the network. For example, the techniques herein may be used to determine whether a problem exists in the customer network, in the transport/backbone network, or in the network of the remote/cloud destination.

Specifically, according to one or more embodiments of the disclosure as described in detail below, a device in a network receives privatized network trace data that comprises round trip time information for hops along a communication path. The device groups the trace data into a plurality of network segments based on the round trip time information. The device calculates a segment trip time metric for one or more of the network segments based on the round trip time information associated with the one or more network segments.

Illustratively, the techniques described herein may be performed by hardware, software, and/or firmware, such as in accordance with the trace analysis process 248, which may contain computer executable instructions executed by the processor 220 (or independent processor of interfaces 210) to perform functions relating to the techniques described herein. For example, the techniques herein may be treated as extensions to conventional protocols, such as the various networking protocols or wireless communication protocols, and as such, may be processed by similar components understood in the art that execute those protocols, accordingly.

Figure 3:
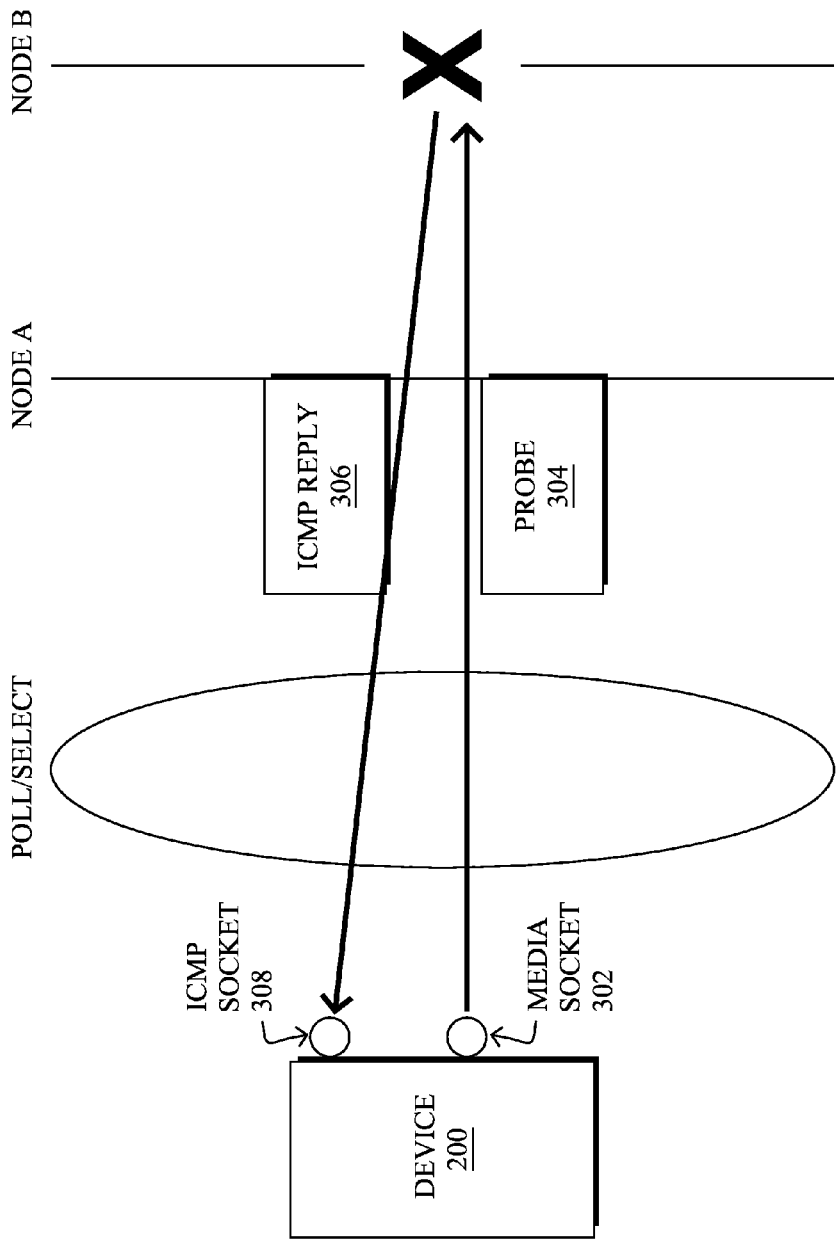
FIG. 3 illustrates an example network trace.

Operationally, a device in a network may obtain trace data for a communication path in any number of ways. One such example of a network trace is shown in FIG. 3, according to some embodiments. As shown, assume that a device 200 is connected to a remote system via a media socket 302. For example, device 200 may be connected to a teleconference or other multimedia session via a Real Time Protocol (RTP) or Secure RTP (SRTP) connection using media socket 302. Along the communication path for the media session may be any number of nodes, such as nodes A and B, also shown in FIG. 3.

Assume, for purposes of illustration, that an interested party/system wishes to obtain information regarding the communication path traversed by the packets associated with media socket 302. However, as would be appreciated, many operating system-based traceroute routines would traverse a different path than that of the UDP packets associated with media socket 302. Various techniques may be used to perform a trace of the actual communication path. For example, the Internet Engineering Task Force (IETF) draft entitled, "STUN Traceroute," by Martinsen et al., which is hereby incorporated by reference, describes a traceroute mechanism that uses STUN packets and returned Internet Control Message Protocol (ICMP) replies, to perform a trace of an RTP or SRTP communication path.

As shown, device 200 may send probe packets 304 along the communication path of interest via media socket 302. In various embodiments, device 200 may set and vary time to live (TTL) parameters in probe packets 304, to garner information about the communication path. Notably, TTL parameters may define when a packet is considered "expired" by the receiving device. For example, node B along the communication path of interest may determine that a particular probe packet 304 is expired, based on the TTL of the packet.

When a device along the path determines that a packet is expired, it may notify the sender as to the expiration. For example, as shown, node B may send an ICMP reply 306 back to ICMP socket 308 of device 200. In this way, the trace process can monitor sockets 302 and 308, e.g., by using select( ) or poll( ) socket calls, to monitor the trace. By varying the TTL values of the probe packets 306, device 200 will receive ICMP responses from different nodes along the path, thereby garnering information about the path of interest. For example, device 200 may receive an ICMP reply from node A when the TTL of the probe packets is set at a very low value, an ICMP reply from node B when the TTL of the probe packets is slightly increased, etc. Thus, by varying the TTL parameters of the probe packets, device 200 can obtain trace information from the different hops along the path of interest. In other embodiments, ICMP socket 308 may be replaced with an error handler that operates in a similar manner.

Figure 4:
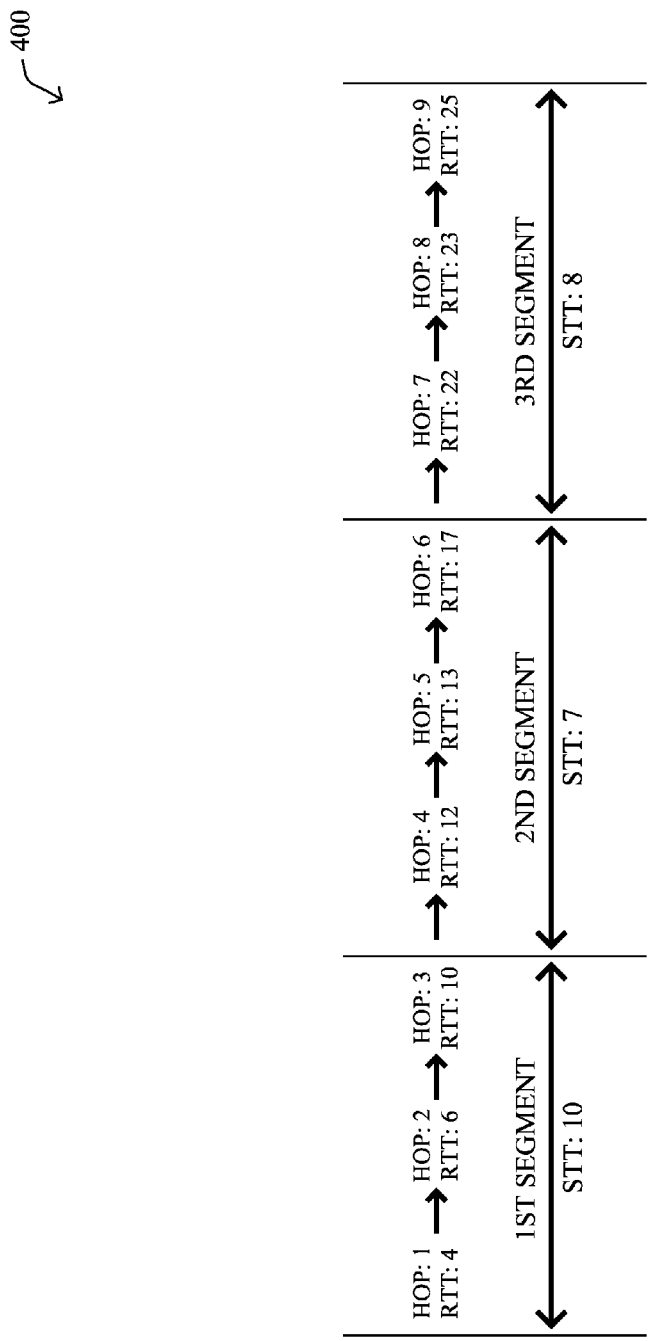
FIG. 4 illustrates an example of a network path divided into segments.

Referring now to FIG. 4, an example illustration 400 is shown of a network path divided into segments, based on network trace data. For example, each segment may correspond to different portions of the network path maintained by different network providers. Metrics associated with each segment and each hop can then be analyzed, to identify a source of problems along the path.

When full trace information is available, determining the topology and performance metrics of a path is relatively straightforward. In particular, full trace information may identify the network addresses of the hops along the path, their RTTs, loss metrics, and owner information for the various segments of the path (e.g., by performing a lookup of the IP addresses of the hops).

In some embodiments, a node/hop along a traced path may be configured with privacy controls, to ensure that the node does not reveal too much information about the node or the network itself. In particular, leaking IP addresses can reveal the network topology of an entity that the entity may wish to keep secret. At the most extreme, the entity may block ICMP responses or other messages at the edge of its network, in an effort to prevent trace information from being accessible. However, in various embodiments, the nodes/devices along a path may also be configured to provide privatized network trace data that includes only minimal or reduced trace information (e.g., as opposed to identifying the network addresses of the hops, etc.). In other words, as used herein, privatized network trace data refers to network trace data that withholds certain meta-information via a privacy mechanism, such as not including address information regarding hops along the path.

In situations in which the returned network trace data has been privatized, discerning information about the network path becomes increasingly challenging as the amount of trace information decreases. In turn, this may limit and/or prevent pinpointing a misbehaving hop along the path. However, using the techniques herein, at least some rough analysis and diagnostics can be performed on the minimized trace datasets. For example, the techniques herein may be used to determine roughly whether a source of problems along a path is located at the customer portion of the path, the transit portion of the path, or at the cloud/server portion of the path.

Figure 5:
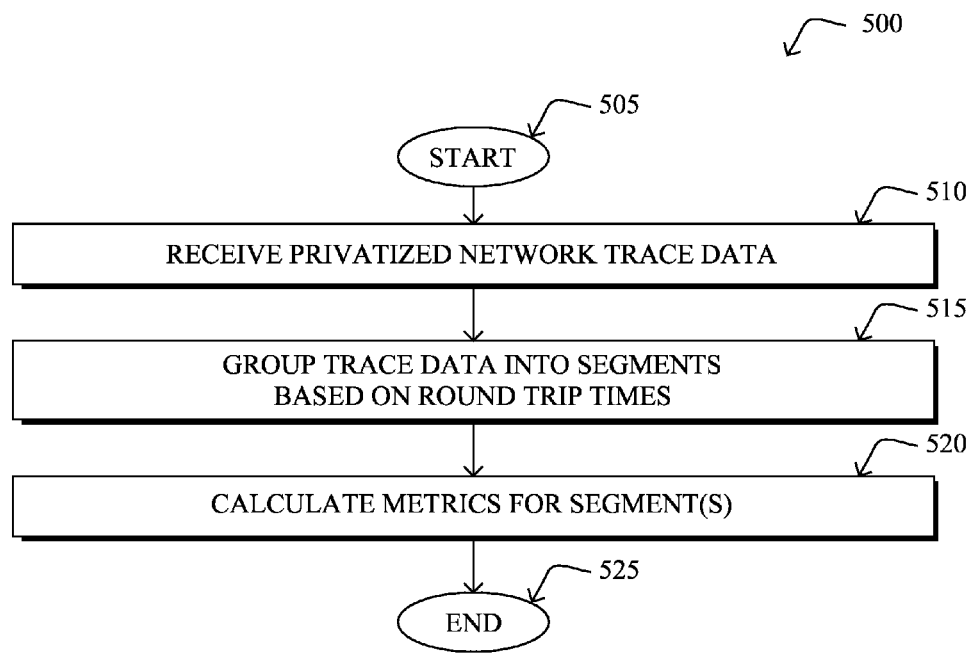
FIG. 5 illustrates an example simplified procedure for calculating metrics for a network segment.

Referring now to FIG. 5, an example simplified procedure for calculating metrics for a network segment is shown, in accordance with various embodiments herein. Procedure 500 may begin at step 505 and continue on to step 510 where, as described in greater detail above, a device in a network may receive privatized network trace data. In other words, in some cases, the received trace data may include a reduced set of information regarding the network path. For example, the privatized network trace data may specifically exclude network address information regarding the hops along the path such as, e.g., public, private, and or local IP addresses. In one embodiment, the privatized network trace data may include only RTT information. In other embodiments, however, the privatized network trace data may include both RTT information, as well as HOP/TTL information.

At step 515, the device may group the received trace data into segments based on the RTT information. In one embodiment, the device may use a predefined number of segments to which the trace responses may be associated. For example, the trace information may be grouped into three separate segments, to represent the local network of the client application, the transport network, and the server/cloud network. However, any number of different segments may be used. As noted previously, the trace responses may include only a minimal amount of information, such as the RTTs of the traces. In such cases, the device may sort the responses by RTTs, to group the response into segments. In another embodiment, the device may use a machine learning-based technique, such as classification or clustering, to associate the trace responses with different segments.

At step 520, the device may compute one or more metrics for the one or more path segments. In one embodiment, the device may determine a segment trip time (STT) based on the RTTs of the response associated with the segments. For example, the STT for the first segment may be the RTT of the last hop/trace response associated with the segment, the STT for the second segment may be the difference between the RTTs of the last hop/response of the first segment and the second segment, etc. In various embodiments, the segment metric(s) may be used to detect and diagnose problems along the probed path. Procedure 500 then ends at step 525.

Figure 6:
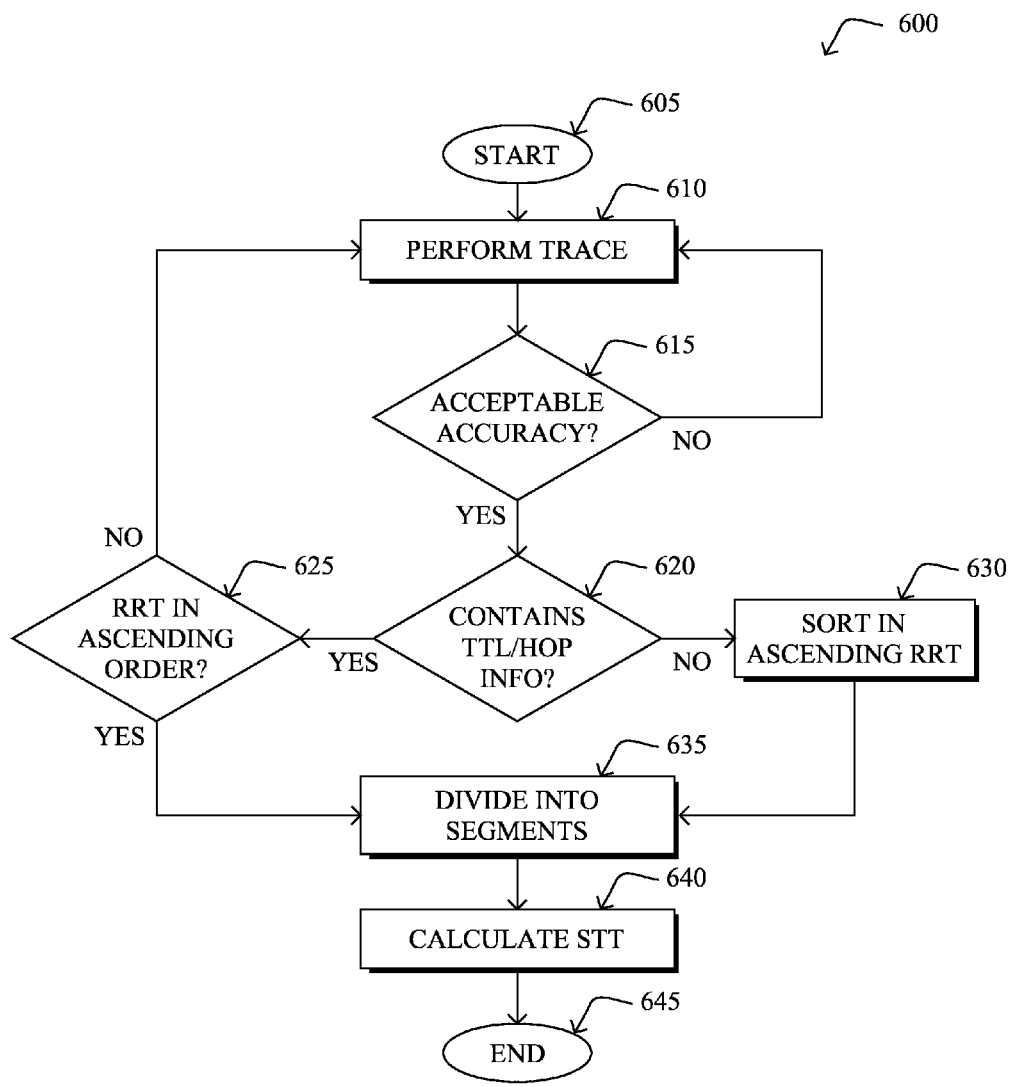
FIG. 6 illustrates an example simplified procedure for assessing a network path.

Referring now to FIG. 6, an example simplified procedure is illustrated for assessing a network path, in accordance with various embodiments herein. Procedure 600 may be performed by a device in a network such as, e.g., device 200 described above. Procedure 600 may begin at step 605 and continue on to step 610 where the device may perform a network trace of a path in the network. Any number of different types of traces may be performed. In one embodiment, the device may perform a STUN-based trace of the path. For example, the device may perform a trace of a network path used by an RTP or SRTP session by sending STUN packets along the path with varying TTLs (or HOP limits if IPv6 is used) and analyze the corresponding ICMP responses.

In various embodiments, the trace data generated by performing the trace may be privatized trace information. In other words, the returned trace data may include only a limited amount of information about the path (e.g., is minimized in some way by the entity in control of that portion of the path). For example, the trace data may specifically exclude address information for a given hop along the path. In a further example, the trace data may also exclude TTL/hop information. In other cases, the returned trace data may only include RTT information, providing only a minimal amount of information regarding the path.

At step 615, the device may determine whether the received trace data is acceptable in terms of accuracy. In various embodiments, the device may perform any number of traces along the path, to ensure that the received trace data is accurate. For example, the device may perform n-number of traces in step 610 and compare the results, to determine whether the results are consistent. In various embodiments, the device may use any or all of the following approaches, to determine whether the trace results are acceptable: statistical analysis (e.g., confidence intervals, etc.), machine learning-based outlier analysis, predefined thresholds (e.g., if the results differ by x %, etc.), or any other technique that may be used to assess whether the results from multiple traces acceptable. If the results are not acceptable, procedure 600 may return to step 610 and the traces repeated any number of times. Otherwise, procedure 600 may continue on to step 620.

At step 620, the device may determine whether the received trace data contains TTL/hop information. As noted previously, at minimum, the trace data may include RTT information. However, an intermediary approach to protect the privacy of the devices along the path may be to return RTT information with TTL/hop information (e.g., while still excluding network addresses, autonomous system information, etc.). As would be appreciated, the inclusion of TTL/hop information may improve the accuracy of the overall process, but is not a requirement to assess the path. If the received trace data include TTL/hop information, procedure 600 may continue on to step 625. Otherwise, procedure 600 may proceed to step 630.

At step 625, the device may determine whether the received RTT and TTL/hop information is in ascending order by RTT. Notably, the RTT for each consecutive node along the path should increase with the hop count (e.g., the RTT to the third node should be greater than that of the second node, etc.). If not, procedure 600 may return to step 610 where one or more additional traces are performed. However, if the received information is in the expected order by RTT, procedure 600 may continue on to step 635.

At step 630, if the trace data does not include TTL/hop information, the device may sort the trace data by RTTs in ascending order. As noted above with respect to step 625, if the received network trace data includes TTL/hop information, the device has information regarding the ordering of the nodes/hops along the path. In turn, the device can use this information to ensure that the RTTs are consistent with this ordering. However, in the case that the trace dataset has been even more privatized/minimized, even this ordering may not be available to the device. In such cases, the device may sort the returned RTT information in ascending order, under the assumption that the next consecutive RTT in the series is associated with the next hop along the path.

At step 635, as described in greater detail above, the device may divide the received trace data by assigning the trace results to a plurality of segments. For example, the device may assign the trace results to two or more segments by evenly distributing the trace results, applying a machine learning-based classifier to the set of trace results, or in any other way. As would be appreciated, by assigning even the privatized/minimalized trace data to different segments, this may enable garnering at least a rough estimate of where a problem may exist along the network path.

At step 640, as detailed above, the device may calculate an STT or other metric for one or more of the path segments. In doing so, this gives a rough estimate of the time a given trace packet and reply spent on any given segment of the path. In various embodiments, the calculated STT or other metrics may be used to diagnose a cause of delays along the path. In particular, an abnormally high STT may indicate that the node/hop that is the source of the delays is located in the path segment that exhibits the abnormal STT. For example, assume that the path of interest is divided into three segments, to represent the local network of the client application, the transit portion of the path (e.g., as operated by a service provider), and the cloud/server portion of the path. Further, assume that the segment that represents the network of the client/application is exhibiting an abnormally high STT. In such a case, the network administrator may be notified to initiate further analysis of the network (e.g., the device may issue an alert, etc.). Procedure 600 then ends at step 645.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, provide network trace analysis techniques for situations in which the returned trace data includes only a reduced amount of information regarding the probed path. In particular, the techniques herein allow for the rough analysis of trace data that has been privatized in some manner such as, e.g., by specifically excluding address information for hops along the traced path.

While there have been shown and described illustrative embodiments that provide for dynamic enabling of routing devices in a shared-media communication network, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of networks. In addition, while certain protocols are shown, other suitable protocols may be used, accordingly. Further, while certain embodiments herein have been described in conjunction with performing a STUN-based trace, it should be appreciated that the techniques herein may be applied to any other form of network trace and are not limited as such.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a device in a network, privatized network trace data that comprises round trip time information for hops along a communication path;
grouping, by the device, the trace data into a plurality of network segments based on the round trip time information, wherein grouping the trace data into the plurality of network segments based on the round trip time information comprises:
 sorting, by the device, the trace data by round trip time to identify which of the plurality of network segments the trace data belongs; and
 based on the sorting, assigning, by the device, each of the round trip times to one of the plurality of network segments;
based on the grouping, calculating, by the device, a segment trip time metric for one or more of the network segments based on the round trip time information associated with the one or more network segments; and
based on the calculation, identifying, by the device, one of the network segments as a source of delay along the communication path based on the calculated segment trip time metrics for the plurality of network segments.

2. The method as in claim 1, wherein the privatized network trace data excludes address information for the hops along the communication path.

3. The method as in claim 2, wherein the privatized network trace data further excludes hop identification information.

4. The method as in claim 1, wherein receiving the privatized network trace data comprises:
   initiating, by the device, a plurality of traces along the communication path, wherein the device receives the network trace data in response to initiating the plurality of traces.

5. The method as in claim 4, further comprising:
   initiating, by the device, additional traces along the communication path, in response to a determination that the round trip time information is inaccurate.

6. The method as in claim 1, wherein grouping the trace data into the plurality of network segments based on the round trip time information comprises:
   using a machine learning classifier to assign the round trip time information to the plurality of network segments.

7. The method as in claim 1, wherein each of the plurality of network segments is associated with at least one of: a local network segment; a transit network segment; or a remote network segment.

8. An apparatus, comprising:
   one or more network interfaces to communicate with a network;
   a processor coupled to the network interfaces and configured to execute one or more processes; and
   a memory configured to store a process executable by the processor, the process when executed configured to:
      receive privatized network trace data that comprises round trip time information for hops along a communication path;
      group the trace data into a plurality of network segments based on the round trip time information, wherein the trace data is grouped into the plurality of network segments based on the round trip time information by:
         sorting, by the device, the trace data by round trip time; and
         based on the sorting, assigning, by the device, each of the round trip times to one of the plurality of network segments;
      based on the grouping, calculate a segment trip time metric for one or more of the network segments based on the round trip time information associated with the one or more network segments; and
      based on the calculating, identify one of the network segments as a source of delay along the communication path based on the calculated segment trip time metrics for the plurality of network segments.

9. The apparatus as in claim 8, wherein the privatized network trace data excludes address information for the hops along the communication path.

10. The apparatus as in claim 9, wherein the privatized network trace data further excludes hop identification information.

11. The apparatus as in claim 8, wherein receiving the privatized network trace data comprises:
    initiating a plurality of traces along the communication path, wherein the device receives the network trace data in response to initiating the plurality of traces.

12. The apparatus as in claim 11, further comprising:
    initiating additional traces along the communication path, in response to a determination that the round trip time information is inaccurate.

13. The apparatus as in claim 8, wherein grouping the trace data into the plurality of network segments based on the round trip time information comprises:
    using a machine learning classifier to assign the round trip time information to the plurality of network segments.

14. The apparatus as in claim 8, wherein each of the plurality of network segments is associated with at least one of: a local network segment; a transit network segment; or a remote network segment.

15. A tangible, non-transitory, computer-readable media having software encoded thereon, the software when executed by a processor configured to:
    receive privatized network trace data that comprises round trip time information for hops along a communication path;
    group the trace data into a plurality of network segments based on the round trip time information, wherein the trace data is grouped into the plurality of network segments based on the round trip time information by:
       sorting, by the device, the trace data by round trip time; and
       based on the sorting, assigning, by the device, each of the round trip times to one of the plurality of network segments;
    based on the grouping, calculate a segment trip time metric for one or more of the network segments based on the round trip time information associated with the one or more network segments; and
    based on the calculating, identify one of the network segments as a source of delay along the communication path based on the calculated segment trip time metrics for the plurality of network segments.

16. The computer-readable media as in claim 15, wherein the network trace data is generated in response to running a STUN-based trace.

* * * * *